United States Patent
Katano et al.

(10) Patent No.: US 7,612,986 B2
(45) Date of Patent: Nov. 3, 2009

(54) ALUMINUM PLATE FOR ALUMINUM ELECTROLYTIC CAPACITOR ELECTRODE, ALUMINUM ELECTROLYTIC CAPACITOR, AND METHOD FOR MANUFACTURING ALUMINUM ELECTROLYTIC CAPACITOR

(75) Inventors: Masahiko Katano, Ihara-gun (JP); Masashi Isobe, Ihara-gun (JP); Shinichi Arai, Tokyo (JP)

(73) Assignee: Nippon Light Metal Company, Ltd., Tokyo (JP)

( * ) Notice: Subject to any disclaimer, the term of this patent is extended or adjusted under 35 U.S.C. 154(b) by 292 days.

(21) Appl. No.: 11/816,979

(22) PCT Filed: Mar. 13, 2006

(86) PCT No.: PCT/JP2006/304854
§ 371 (c)(1),
(2), (4) Date: Aug. 23, 2007

(87) PCT Pub. No.: WO2006/100949
PCT Pub. Date: Sep. 28, 2006

(65) Prior Publication Data
US 2009/0021892 A1    Jan. 22, 2009

(30) Foreign Application Priority Data
Mar. 23, 2005    (JP) ............................. 2005-084108

(51) Int. Cl.
*H01G 9/00*    (2006.01)
(52) U.S. Cl. .................... 361/523; 361/516; 361/519; 361/525; 361/528; 361/529
(58) Field of Classification Search ................. 361/523, 361/525, 516–519, 508–512, 528, 529–540; 29/25.01, 25.03
See application file for complete search history.

(56) References Cited

U.S. PATENT DOCUMENTS 6,459,565 B1 * 10/2002 Lessner et al. .............. 361/508

(Continued)

FOREIGN PATENT DOCUMENTS

JP    3-0613333 (B2)    9/1991

(Continued)

OTHER PUBLICATIONS

Form PCT/ISA/210 (International Search Report) dated Jun. 13, 2006.

*Primary Examiner*—Nguyen T Ha
(74) *Attorney, Agent, or Firm*—Buchanan Ingersoll & Rooney PC

(57) ABSTRACT

An aluminum plate having an aluminum purity of not less than 99.98% by mass and an Fe content of 5 to 50 ppm with the balance consisting of unavoidable impurities is used to realize increased capacitance of an aluminum electrolytic capacitor, reduced height, and improved high frequency characteristics. In this aluminum plate, the total content of Fe in crystal/precipitate is 1 to 50% based on the original content, and the thickness of the aluminum plate 0.2 to 1 mm. In the formation of a capacitor anode, the aluminum plate is subjected to alternate current etching so as to leave a core part having an average thickness of 50 to 150 μm in the center part in the thickness-wise direction to increase the surface area, followed by anodic oxidation.

18 Claims, 3 Drawing Sheets

U.S. PATENT DOCUMENTS

| | | | | |
|---|---|---|---|---|
| 6,801,424 B1 * | 10/2004 | Nielsen et al. | ............... | 361/517 |
| 6,816,357 B2 * | 11/2004 | Takatani et al. | ............. | 361/523 |
| 6,865,071 B2 * | 3/2005 | Katsir et al. | ................ | 361/523 |
| 7,170,736 B2 * | 1/2007 | Hawe et al. | ................ | 361/305 |
| 7,224,575 B2 * | 5/2007 | Sherwood | ................... | 361/508 |
| 7,411,779 B2 * | 8/2008 | Merker et al. | ............... | 361/523 |

FOREIGN PATENT DOCUMENTS

| | | |
|---|---|---|
| JP | 6-181146 (A) | 6/1994 |
| JP | 3393607 (B2) | 4/2003 |
| JP | 2004-149835 (A) | 5/2004 |
| JP | 2004-319795 (A) | 11/2004 |

* cited by examiner

×400

ALUMINUM PLATE FOR ALUMINUM ELECTROLYTIC CAPACITOR ELECTRODE, ALUMINUM ELECTROLYTIC CAPACITOR, AND METHOD FOR MANUFACTURING ALUMINUM ELECTROLYTIC CAPACITOR

TECHNICAL FIELD

The present invention relates to an aluminum plate for an aluminum electrolytic capacitor electrode, an aluminum electrolytic capacitor, and a method for manufacturing an aluminum electrolytic capacitor.

BACKGROUND ART

The increasing multi-functionality of cellular phones is representative of the increasing volume of information processing in recent years, but while semiconductor processing performance has increased, capacitor performance has not kept pace in response thereto. The increase in information-processing performance could be referred to in other words as an increase in processing electrical current at higher frequencies. An increase in electrical capacitance is essential for handling increases in processing electrical current at high frequencies. For example, tantalum electrolytic capacitors are used in most cellular phones at present. These tantalum electrolytic capacitors have a larger electrical capacitance than aluminum electrolytic capacitors in low-frequency regions, but capacitance greatly decreases in high-frequency regions due to factors based on the sintered structure of these capacitors and falls short of the characteristics that are actually needed.

On the other hand, conventional solid aluminum electrolytic capacitors are incapable of obtaining greater electrical capacitance than tantalum electrolytic capacitors. Even though the high-frequency characteristics are better than in tantalum electrolytic capacitors, conventional solid aluminum electrolytic capacitors cannot handle large electrical currents in high-frequency regions. The aluminum material used in these aluminum electrolytic capacitors is usually molten aluminum that has a purity of 99.9% or more by mass and that is made into a slab by semi-continuous casting. A product having a thickness of 0.05 to 0.12 mm is completed after facing, homogenizing treatments, hot rolling, and, as necessary, process annealing and cold rolling. Depending on the maker, the surface area is then enlarged by alternating or direct current in a step referred to as "etching," after which a dielectric film is formed on the surface in a chemical formation step, and an electrode for an electrolytic capacitor is fashioned. The electrical capacitance of a commercial aluminum electrolytic capacitor foil manufactured using such steps is approximately, e.g., 100 $\mu F/cm^2$ for a low-voltage article formed at 20 V by a chemical process and 1.2 $\mu F/cm^2$ for high-voltage article formed at 370 V by a chemical process. Increased capacitance for layered solid aluminum electrolytic capacitors is therefore attained by increasing the number of layers.

The etching in this case should involve dissolving the aluminum foil and thereby enlarging the surface area of the foil, allowing a higher electrical capacitance according to the depth of the etching, but when etching pits become connected during the progression of etching, high electrical capacitance will not be obtainable. Various studies involving, e.g., controlling components other than aluminum in these aluminum foils are accordingly being undertaken (see, e.g., Patent Documents 1, 2, 3, 4).

[Patent Document 1] JP-A 6-181146
[Patent Document 2] JP-A 2004-149835
[Patent Document 3] JP-B 3-61333
[Patent Document 4] Japanese Patent No. 3393607

DISCLOSURE OF THE INVENTION

Problems the Invention is Intended to Solve

However, even the aluminum foils disclosed in the aforementioned patent documents have not reached the point where etching can be made to proceed deeply enough to obtain high electrical capacitance and solve the aforementioned problems of solid aluminum electrolytic capacitors. A large number of layers must therefore be used when structuring solid aluminum electrolytic capacitors. Problems therefore arise in that the capacitor is large in the height dimension, and user demand for thinner products cannot be addressed.

The anode lead is conventionally joined using, e.g., the surface of the anode. Problems therefore arise in that the high-frequency characteristics are reduced by structural factors inherent in this configuration to the extent that the member of layers is increased. Problems have also arisen in that when the anode lead is joined to, e.g., the surface of the anode, that portion will no longer provide electrical capacitance.

In light of these problems, it is an object of the present invention to provide an aluminum plate for an aluminum electrolytic capacitor electrode, an aluminum electrolytic capacitor, and method for manufacturing an aluminum electrolytic capacitor that will allow increased capacitance, reduced size, and improved high-frequency characteristics in an aluminum electrolytic capacitor.

Means for Solving the Problems

The present inventors discovered that an electrode material for a high-capacitance, small-sized solid aluminum electrolytic capacitor having good high-frequency characteristics can be implemented by fashioning an aluminum slab, which is 99.98% pure or more by mass, contains 5 to 50 ppm of Fe, and is manufactured by continuous casting or semi-continuous casting, into a 0.2 to 1-mm-thick plate using proper heat treatments and rolling; etching the plate using alternating current or direct current until the average thickness of a core part reaches 50 to 150 μm; and allowing an anode lead to be joined to a lead wire or the like on a lateral face of the core part. The inventors subsequently submitted the present application.

In other words, the present invention involves, first, optimizing the aluminum purity, the Fe content, and the total content of crystallized or precipitated Fe or the cube orientation content, thereby allowing deep etching without the etching pits being joined. The present invention also involves causing the thickness to be 0.2 to 1 mm, whereby a high electrical capacitance is obtained by performing deeper etching. Characteristic results of combining these configurations are the ability of the core part to remain thick and the ability to join the lead wire or other anode lead to a lateral face of the core part.

The etching may be alternating-current etching or direct-current etching. Alternating-current etching is used when manufacturing a low-voltage aluminum electrolytic capacitor.

In fields in which such alternating-current etching is used, the aluminum plate for an aluminum electrolytic capacitor electrode according to the present invention is characterized in comprising aluminum of not less than 99.98% by mass, an Fe content of 5 to 50 ppm, with the balance consisting of unavoidable impurities, wherein the total content of crystallized or precipitated Fe is 1 to 50% of the original Fe content.

An aluminum electrolytic capacitor according to the present invention is characterized in comprising aluminum of not less than 99.98% by mass, an Fe content of 5 to 50 ppm, with the balance consisting of unavoidable impurities, wherein the total content of crystallized or precipitated Fe is 1 to 15 ppm.

The thickness of the aluminum plate in the present invention is preferably 0.2 to 1 mm.

An aluminum electrolytic capacitor according to the present invention is characterized in comprising a capacitor anode in which an aluminum plate is etched so as to leave a core part having an average thickness of 50 to 150 μm in the central portion in the thickness direction, in which a dielectric film and a solid electrolyte layer are formed on at least the etching surface, and in which the aluminum plate is composed of aluminum of not less than 99.98% by mass, an Fe content of 5 to 50 ppm, with the balance consisting of unavoidable impurities, and has a total content of crystallized or precipitated Fe of 1 to 50% of the original Fe content and a thickness of 0.2 to 1 mm; and an anode lead that is electrically connected to the core part of the capacitor anode.

An aluminum electrolytic capacitor according to the present invention is characterized in comprising a capacitor anode in which an aluminum plate is etched so as to leave a core part having an average thickness of 50 to 150 μm in the central portion in the thickness direction, in which a dielectric film and a solid electrolyte layer are formed on at least the etching surface, and in which the aluminum plate is composed of aluminum of not less than 99.98% by mass, an Fe content of 5 to 50 ppm, with the balance consisting of unavoidable impurities, and has a total content of crystallized or precipitated Fe of 1 to 15 ppm and a thickness of 0.2 to 1 mm; and an anode lead that is electrically connected to the core part of the capacitor anode.

In the aluminum electrolytic capacitor according to the present invention, the etching is preferably performed over the entirety of the front and back surfaces of the capacitor anode.

In the present invention, the anode lead is preferably joined to a lateral face of the core part. A plurality of the capacitor anodes are also preferably layered together.

A method for manufacturing an aluminum electrolytic capacitor according to the present invention is characterized in comprising performing alternating-current etching and enlarging the surface area of an aluminum plate, which is composed of aluminum of not less than 99.98% by mass, an Fe content of 5 to 50 ppm, with the balance consisting of unavoidable impurities, and which has a total content of crystallized or precipitated Fe of 1 to 50% of the original Fe content and a thickness of 0.2 to 1 mm, so as to leave a core part having an average thickness of 50 to 150 μm in the central portion in the thickness direction; subsequently performing anodic oxidation; and forming a capacitor anode.

A method for manufacturing an aluminum electrolytic capacitor according to the present invention is characterized in comprising performing alternating-current etching and enlarging the surface area of an aluminum plate, which is composed of aluminum of not less than 99.98% by mass, an Fe content of 5 to 50 ppm, with the balance consisting of unavoidable impurities, and which has a total content of crystallized or precipitated Fe of 1 to 15 ppm and a thickness of 0.2 to 1 mm, so as to leave a core part having an average thickness of 50 to 150 μm in the central portion in the thickness direction; subsequently performing anodic oxidation; and forming a capacitor anode.

The method for manufacturing an aluminum electrolytic capacitor according to the present invention also preferably comprises cutting the aluminum plate after the anodic oxidation, and forming the capacitor anode having the entire front and back surfaces subjected to the alternating-current etching and the anodic oxidation.

Meanwhile, direct-current etching is used when manufacturing general middle to high voltage aluminum electrolytic capacitors, and has the advantage of allowing the solid electrolyte layer to be reliably formed to a considerable depth since the diameter of the etching pits is large when etching using such methods. Depending on the desired characteristics of the electrolytic capacitor, direct-current etching can therefore be used for low-voltage solid aluminum electrolytic capacitors, as well.

In fields in which such direct-current etching is used, the aluminum plate for an aluminum electrolytic capacitor electrode according to the present invention is characterized in comprising aluminum of not less than 99.98% by mass, an Fe content of 5 to 50 ppm, with the balance consisting of unavoidable impurities, wherein the cube orientation content is 80% or more, and the thickness is 0.2 to 1 mm.

An aluminum electrolytic capacitor according to the present invention is characterized in comprising a capacitor anode in which an aluminum plate is etched so as to leave a core part having an average thickness of 50 to 150 μm in the central portion in the thickness direction, in which a dielectric film and a solid electrolyte layer are formed on at least the etching surface, and in which the aluminum plate is composed of aluminum of not less than 99.98% by mass, an Fe content of 5 to 50 ppm, with the balance consisting of unavoidable impurities, and has a cube orientation content of 80% or more and a thickness of 0.2 to 1 mm; and an anode lead that is electrically connected to the core part of the capacitor anode.

In this case, as well, the etching is preferably performed over the entirety of the front and back surfaces of the capacitor anode when structuring a solid electrolytic capacitor. The anode lead is preferably joined to a lateral face of the core part. A plurality of the capacitor anodes are also preferably layered together.

A method for manufacturing an aluminum electrolytic capacitor according to the present invention is characterized in comprising performing direct-current etching and enlarging the surface area of an aluminum plate, which is composed of aluminum of not less than 99.98% by mass, an Fe content of 5 to 50 ppm, with the balance consisting of unavoidable impurities, and which has a cube orientation content of 80% or more and a thickness of 0.2 to 1 mm, so as to leave a core part having an average thickness of 50 to 150 μm in the central portion in the thickness direction; subsequently performing anodic oxidation; and forming a capacitor anode.

The method for manufacturing an aluminum electrolytic capacitor according to the present invention also preferably comprises cutting the aluminum plate after the anodic oxidation, and forming the capacitor anode having the entirety of front and back surfaces subjected to the direct-current etching and the anodic oxidation.

The method for manufacturing an aluminum electrolytic capacitor according to the present invention also preferably comprises joining an anode lead to a lateral face of the core part. The lateral faces of the core part are not intended to provide electrical capacitance; therefore, unlike cases in which the anode lead is joined to the surface of the anode, the situation in which the anode-lead joining locations do not provide electrical capacitance can be avoided. Deterioration of high-frequency characteristics due to structural factors at the portions for joining anode leads can also be avoided even when using numerous layers. The entirety of the front and back surfaces of the aluminum plate is etched, whereby the aluminum plate can be used effectively, and therefore electrical capacitance can be increased thereby.

In the method for manufacturing an aluminum electrolytic capacitor according to the present invention, laser welding is preferably used when joining the anode lead to the lateral face of the core part. If laser welding is used, the spot can be focused according to the thickness of the lateral face of the core part. The dielectric film will not be present on the lateral face of the core part in this case if the lateral face is cut after anodic oxidation, but if anodic oxidation is performed when the lateral face of the core part is exposed, the dielectric film can be formed on the lateral face of the core part, as well. In this latter case, laser welding may be performed after the dielectric film has been removed from the lateral face of the core part, but laser welding allows the core part and the anode lead to be joined even when the dielectric film is formed on the lateral face of the core part.

KEY

Figure 1:
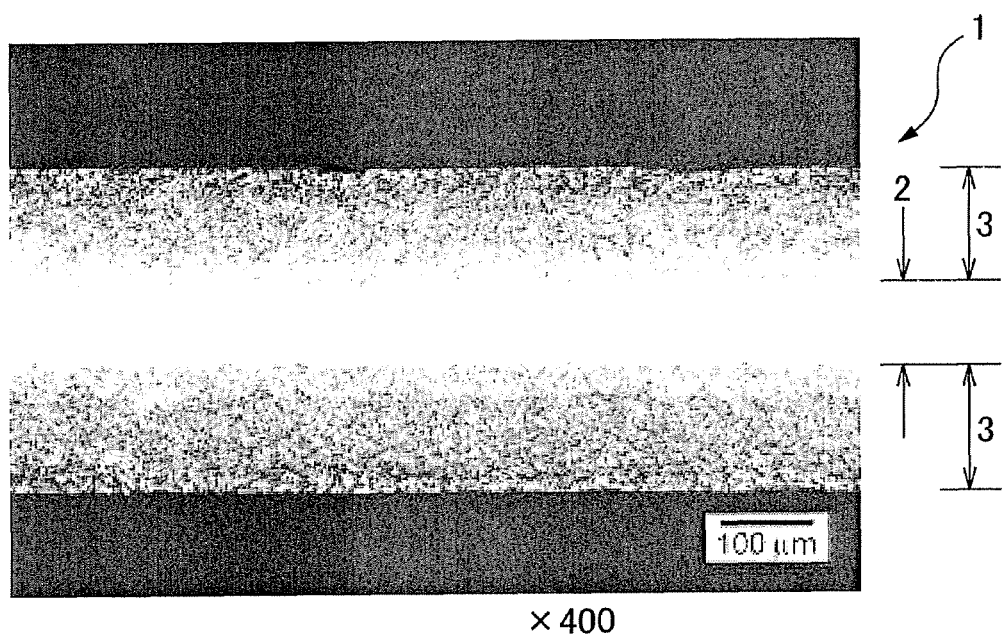
FIG. 1 is a diagram that displays a cross-sectional photograph after performing alternating-current etching on an aluminum plate for an aluminum electrolytic capacitor electrode according to Embodiment 1 of the present invention.

1 Aluminum plate for an aluminum electrolytic capacitor electrode
2 Core part
3 Etching-pit part
4 Lateral face
5 Weld part
6 Lead wire

BEST MODE FOR CARRYING OUT THE INVENTION

Described below are embodiments corresponding to cases in which alternating-current etching is employed as the etching treatment and embodiments corresponding to cases in which direct-current etching is employed as the etching treatment.

Embodiment 1

(Basic Configuration)

The present aspect corresponds to cases in which alternating-current etching is employed. The aluminum plate for an aluminum electrolytic capacitor electrode according to the present aspect comprises aluminum of not less than 99.98% by mass, an Fe content of 5 to 50 ppm, with the balance consisting of unavoidable impurities, wherein the total content of crystallized or precipitated Fe is 1 to 50% of the original Fe content, and the thickness is 0.2 to 1 mm.

When a solid aluminum electrolytic capacitor is manufactured using such an aluminum plate, alternating-current etching is first performed and the surface area of the aluminum plate is enlarged so as to leave a core part having an average thickness of 50 to 150 μm in the central portion in the thickness direction, after which anodic oxidation is performed, and a capacitor anode is formed.

FIG. 1 shows a cross-sectional photograph in which alternating-current etching has been performed on an aluminum plate 1 so as to leave a core part 2 having an average thickness of 100 μm in the central portion in the thickness direction, and in which etching-pit parts 3 have been formed. The aluminum plate 1 comprises, e.g., aluminum of not less than 99.98% by mass, 30 ppm of Fe, with the balance consisting of unavoidable impurities, wherein the total content of crystallized or precipitated Fe is 5% of the original Fe content, and the thickness is 0.35 mm. The elemental content of the impurities is 35 ppm of Si, 1.5 ppm of Ni, 1 ppm or less of Ti, 1 ppm or less of Zr, 2 ppm or less of other individual elements.

The aluminum plate 1 is then subjected to anodic oxidation, and a dielectric film is formed on the aluminum plate 1, after which the aluminum plate 1 is cut to a prescribed size. As a result, a capacitor anode in which the entirety of the front and back surfaces of the aluminum plate 1 have been subjected to alternating-current etching and anodic oxidation can be obtained.

Figure 2:
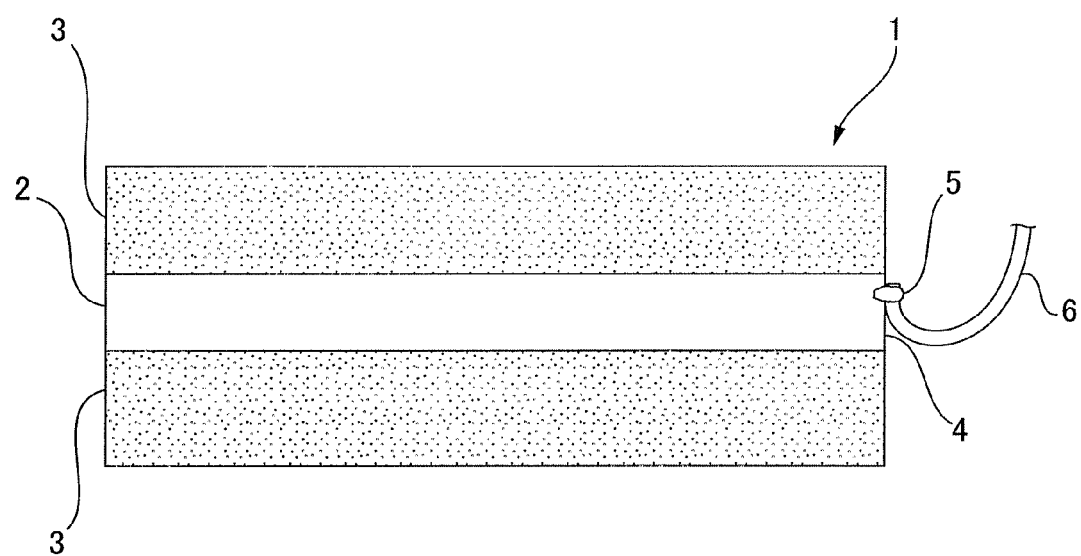
FIG. 2 is a descriptive diagram that shows a condition in which an anode lead has been attached to a lateral end part of the core part of the aluminum electrolytic capacitor electrode according to Embodiment 1 of the present invention.

A lead wire or other anode lead is joined to a lateral face of the core part 2 of the capacitor anode. FIG. 2 is a descriptive diagram that shows a condition in which an anode lead has been attached to a lateral end part of the core part of the aluminum electrolytic capacitor electrode according to Embodiment 1 of the present invention. As shown in FIG. 2, a lead wire 6 or other anode lead is joined to a lateral face 4 of the core part 2 of the capacitor anode, which is sandwiched by the etching-pit parts 3 formed on the aforedescribed aluminum plate by alternating-current etching. The joining method is preferably laser welding in which the spot diameter is focused to less than the thickness of the core part. A practical spot diameter is 20 to 100 μm.

A solid electrolyte layer is then formed on the surface of the capacitor anode, after which a cathode is formed on the surface of the solid electrolyte layer using a carbon paste, a silver paste, or the like; and an electrode article is formed. A prescribed number of electrode articles are then layered, and a solid aluminum electrolytic capacitor is manufactured. It is accordingly possible to manufacture a solid aluminum electrolytic capacitor comprising the capacitor anodes, which have the dielectric film and the solid electrolyte layer formed on at least the etching surface, and the anode leads, which are electrically connected to the core parts of the capacitor anodes.

The order of the steps performed after the formation of the capacitor anode may be changed depending on the shape of the electrode, but joining the anode lead to a lateral face of the core part of the capacitor anode is preferable in all cases.

(Detailed Configuration)

The purity of the aluminum is 99.98% or more by mass when etching is so performed using alternating electrical current. When the aluminum content, i.e., the aluminum purity, is less than the lower limit, a variety of metal compounds will crystallize or precipitate to an excessive degree during slab casting, homogenizing treatments, hot rolling, or other steps. These metal compounds have a different electric potential from the aluminum matrix, and therefore early-dissolving portions will become more numerous and progress excessively during etching, the etching pits will be degraded, and electrical capacitance will decrease.

When the amounts of Si, Ni, and other impurities in the aluminum increase, the amount of metal compounds in the matrix will increase, the pits near these compounds will coalesce during etching, and therefore pits will be more likely to collapse, and electrical capacitance will decrease. When the amounts of Ti, Zr, and other impurities increase, defects will occur in the oxidation film formed during etching, dissolution will be induced over the entire surface, and electrical capacitance will decrease. The amount of Si should be 60 ppm or less, and preferably 40 ppm or less. The amounts of Ni, Ti, and Zr should all be 10 ppm or less, and preferably 3 ppm or less. The amounts of other impurities are preferably 3 ppm or less.

Such high-purity aluminum is manufactured after the primary electrolytic metal has been refined. Three-layer electrolytic methods and crystal fractionation methods are widely employed as the refining method used at this point. The majority of elements (including Fe) other than aluminum are removed by these refining methods. However, Fe can be used as a minor alloying component instead of an impurity. The amounts of various elements are therefore measured after refining, and when the Fe content is less than a prescribed amount, an Al—Fe mother alloy or the like is added to the molten metal during slab casting, whereby the Fe content is adjusted. The Fe content should be 5 to 50 ppm. Controlling the amount of crystallization and precipitation within the appropriate range is difficult when this value exceeds the upper limit, and pit collapse due to [metal] compounds will become more prominent. Conversely, pit starting points will be too few when the amount is less than the lower limit; therefore, electrical capacitance will instead decrease. The amount of Fe is more preferably 5 to 40 ppm.

Controlling the Fe content and the total content of crystallized or precipitated Fe is particularly important when etching using alternating current. Crystals and precipitates containing Fe include, e.g., $Al_mFe$, $Al_6Fe$, $Al_3Fe$, Al—(Fe, M)—Si, and other metal compounds. In this instance, "m" is a number other than 3 or 6, and "M" is a metal element other than Fe. The total content of crystallized or precipitated Fe should be 1 to 50% of the original Fe content, and preferably 1 to 20%. Pit collapse due to metal compounds will become more prominent when the total content of crystallized or precipitated Fe exceeds 50%, while, conversely, pit starting points will be too few when the amount is less than the lower limit; therefore, electrical capacitance will instead decrease. The manufacturing method is not particularly limited as concerns controlling the total content of crystallized or precipitated Fe. Examples may include manufacturing the slab using a rapid-cooling solidifying apparatus such as a belt caster in which the metal cooling speed is 5 to 50° C./s, and using only subsequent cold rolling to provide a prescribed thickness for etching; or homogenizing a semi-continuously cast slab at a temperature of 530° C. or more, manufacturing a plate using hot rolling so that the number of passes required for the plate to reach the temperature region of 300 to 400° C. is 2 or less, and preferably 1 or less, and using only cold rolling to provide a prescribed thickness for etching the hot-rolled plate. The total content of crystallized or precipitated Fe can be measured by well-known analysis methods. Examples of such methods may include dissolving a sample in a hot phenol solution and measuring the residue using an ICP optical emission spectrometer (ICP-OES or an ICP mass spectrometer (ICP-MS).

The etching pits formed by alternating current use numerous compounds present in appropriate amounts as starting points for progression. Branching therefore occurs, and the pit diameter is extremely narrow at several μm or less. When etching using alternating current, branched pits having extremely narrow diameters will be produced in large numbers particularly when the total content of crystallized or precipitated Fe is 1 to 15 ppm, and an electrolytic capacitor having a high product of electrical capacitance and chemical formation voltage can be obtained. The reason is thought to be that Fe-containing crystals and precipitates effectively generate branches during progression of etching, and the number of branched starting points reaches an optimal value when the total content of crystallized or precipitated Fe is in this range. This plate is therefore preferably used as a material for a low-voltage capacitor formed by a chemical process at a voltage of 100 V or less.

Etching using alternating electrical current is performed so that the average thickness of the core part reaches 50 to 150 μm. An electrolyte containing chlorine ions is used when etching using alternating current, and the number of etching stages should be 2 or more. The first stage involves, e.g., flowing an alternating electrical current having a relatively high current density for a short period of time and forming numerous initial pits. In the second and subsequent stages (referred to as "primary etching"), an alternating current having a lower current density than the first stage is used, and an electrolyte having a lower temperature than that of the first stage is preferably used in order to prevent chemically useless dissolution. A 20 to 60° C. solution having 2 to 8 mol/L, of chlorine ions should be used as the electrolyte of the first stage. The addition of a minute amount of sulfate ions, nitrate ions, phosphate ions, oxalate ions, or other types of oxidizing ions alone or in combination is also preferable in order to prevent dissolution of the surface. An addition amount in the range of 0.02 to 0.3 mol/L is adequate. Sine waves, square waves, triangular waves, or the like may be used as the alternating current waveform, and 1 to 100 Hz may be used as the frequency. The current density is preferably 0.5 to 2 $A/cm^2$, and 5 to 50 $C/cm^2$ is an adequate amount of electricity. In subsequent primary etching, a 10 to 40° C. solution having 6 to 8 mol/L of chlorine ions should be used as the electrolyte. The addition of a minute amount of sulfate ions, nitrate ions, phosphate ions, oxalate ions, or other types of oxidizing ions alone or in combination is also preferable in order to prevent dissolution of the surface. An addition amount in the range of 0.1 to 0.3 mol/L is adequate. Sine waves, square waves, triangular waves, AC/DC superimposed waves, or the like may be used as the alternating current waveform, and 1 to 100 Hz may be used as the frequency. The current density is set lower than in the first stage, and a range of 0.1 to 1 $A/cm^2$ is preferable. The amount of electricity is 500 to 4000 $C/cm^2$, which is at least ten times or more the amount used in the first stage, and etching is performed so that the average thickness of the core part reaches 50 to 150 μm.

(Dissolution Behavior of Materials during Alternating-Current Etching)

Hydrochloric acid is the primary acid used in electrolytic etching in which direct or alternating current is used, but the present inventors discovered unusual phenomena in the dissolution behavior of the materials during alternating-current etching in which hydrochloric acid is chiefly used. Specifically, the amount of dissolution due to alternating-current etching is expressed as the sum of the amount of chemical dissolution and the amount of electrical dissolution during alternating-current electrolysis. The amount of chemical dissolution increases substantially linearly in proportion to the total content of crystallized or precipitated Fe. This phenomenon is thought to result from the positive electric potential of Fe-containing crystals and precipitates relative to the matrix. It has been inferred that the area around chemical compounds having a positive electric potential dissolves sooner, whereby the amount of dissolution increases. Another phenomenon is observed whereby the amount of electrical dissolution decreases during alternating-current electrolysis until the total content of crystallized or precipitated Fe reaches a prescribed amount, after which the dissolution amount reverses and begins to increase.

Due to the characteristics of alternating current, electrolytic etching in which alternating current is used involves repeated alternation between dissolution, which occurs primarily in the anode half-cycle, and hydration-film formation, which acts to prevent dissolution and occurs primarily in the cathode half-cycle. The present inventors have not clarified the mechanism of this dissolution and hydration-film formation during alternating-current etching, but have made inferences as follows.

Specifically, the hydration film is not readily formed on the surface of Fe-containing crystals and precipitates due to the difference in electric potential from the matrix, and the concentration of hydrogen ions in the hydration film will decrease if the pits deepen. As a result, it is thought that the hydration film will be formed more thickly in locations having deep pits than in locations having pits near the surface.

The degree of dissolution during the anode half-cycle is presumed to be influenced by the total content of crystallized or precipitated Fe. Specifically, when the total content of crystallized or precipitated Fe is large, i.e., when the amount of Fe-containing compounds is large, early dissolution increases around the Fe-containing compounds in the same manner as chemical dissolution. It is accordingly thought that the dissolution effect occurring primarily in the anode half-cycle will prevail over the dissolution-preventing effect due to the hydration film formed in the cathode half-cycle, the areas around the Fe-containing compounds dissolve early, pits collapse during the etching process, and the amount of dissolution increases.

Conversely, when the total content of crystallized or precipitated Fe is small, i.e., when the amount of Fe-containing compounds is small, it is thought that the dissolution-preventing effect of the thick hydration film that is formed during the cathode half-cycle will prevail over the dissolution effect during the anode half-cycle at locations having deep pits, and dissolution will not readily occur, while pit progression also stagnates; however, at the thin surface layer of the hydration film, which is formed during the cathode half-cycle and has a higher concentration of ions than the locations having deep pits, it is conjectured that the portions at which pits are formed will dissolve early and dissolution will be induced over the entire surface. The amount of dissolution will be large over the entire surface of the surface-layer part even if locations in the deep parts of the pits in which dissolution does not readily occur are present, and the amount of dissolution will effectively increase.

It is thought that there is an optimal value for the quantity of crystalline and precipitant material in alternating-current electrolytic etching. As a result, a downward-bending curve will be obtained when the entire amount of reduction in dissolution during alternating-current electrolytic etching is measured and plotted relative to the total amount of Fe in various crystals and precipitates with the entire amount of reduction in dissolution during alternating-current electrolytic etching on the vertical axis and the total amount of crystallized and precipitated Fe on the horizontal axis. The electrical capacitance after etching and the amount of reduction in dissolution also have a substantially inverse relationship. The reason is that, outside the range of dissolution reduction that is optimal for obtaining high electrical capacitance, the entire surface of the surface layer on which pits are formed will dissolve when the amount of Fe-containing compounds is small, and useless fusion will occur and the pits will collapse when the amount of Fe-containing compounds is large, as described above. The total content of crystallized or precipitated Fe appropriate for the present aspect is 1 to 15 ppm, and preferably 2 to 10 ppm.

Figure 3:
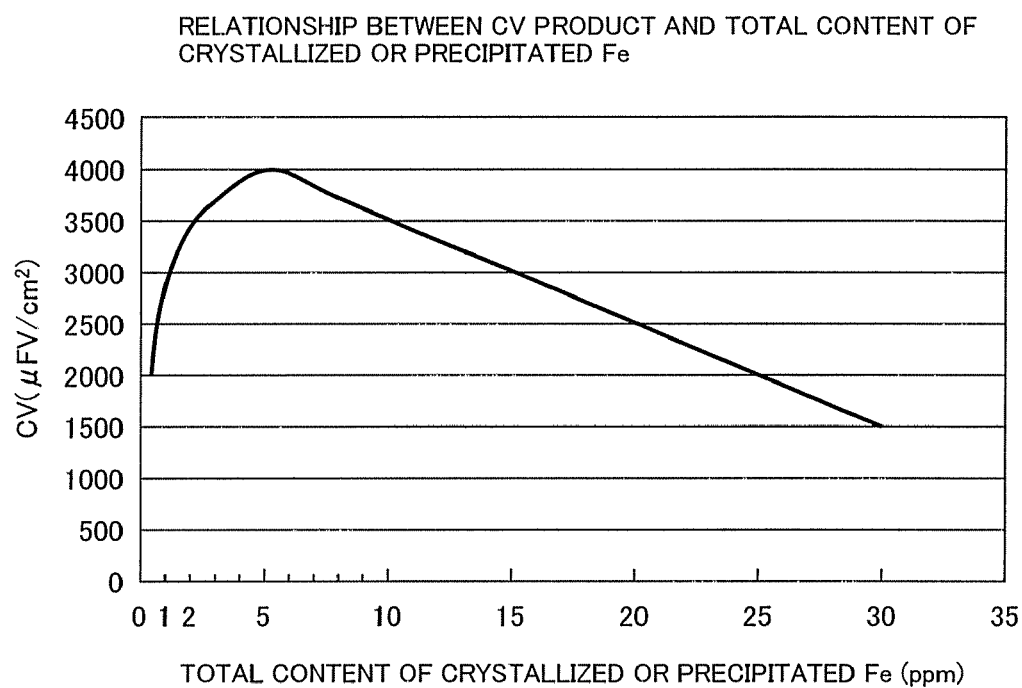
FIG. 3 is a graph that shows the relationship between the CV product and the total content of crystallized or precipitated Fe according to Embodiment 1 of the present invention.

FIG. 3 is a graph that shows the relationship between the CV product (the product of electrical capacitance and chemical formation voltage) and the total content of crystallized or precipitated Fe when 0.35-mm-thick aluminum plates that were provided with various different total amounts of crystallized or precipitated Fe during casting and heat treatments were subjected to alternating-current etching. The plates comprised aluminum of not less than 99.98% by mass, 25 ppm of Fe, with the balance consisting of unavoidable impurities, including 35 ppm of Si, 1.5 ppm of Ni, 1 ppm or less of both Ti and Zr, and 2 ppm or less of other individual elements.

The method for etching the aluminum plates involved, first, degreasing the aluminum plates using a 0.1 N caustic solution, after which initial pits were formed using the first-stage treatment. The initial pits were made to grow and etching pits were completed in the second-stage and third-stage treatments. An anodic oxidation dielectric film was then formed by a chemical process at 20 V in an aqueous solution of ammonium adipate. The electrical capacitance and the film formation voltage were measured after drying. The amount of Fe in Al—Fe metal compounds was measured by dissolving the plates in a hot phenol solution and measuring the residue using ICP. The treatment conditions in the first through third stages were as follows.

First Stage Treatment Conditions

Solution: 4 mol/L, of hydrochloric acid+0.1 mol/L of sulfuric acid 50° C.

Conditions: Sine-wave alternating current, 20 Hz frequency, 50 A/dm$^2$ current density, 45 s electrolysis time Second Stage Treatment Conditions Solution: 5 mol/L of hydrochloric acid+0.1 mol/L of sulfuric acid 32° C.

Conditions: AC/DC superimposed waveform (sine-wave alternating current+DC), 50 Hz frequency, 0.80 duty ratio, 15 A/dm$^2$ current density, 60 s electrolysis time Third Stage Treatment Conditions Solution: 5 mol/L of hydrochloric acid+0.1 mol/L of sulfuric acid 32° C.

Conditions: Sine-wave alternating current, 50 Hz frequency, 25 A/dm$^2$ current density, 2700 s electrolysis time As can be understood from FIG. 3, the CV product is highest when the total content of crystallized or precipitated Fe is 1 to 15 ppm, with a peak at 2 to 10 ppm, or, more exactly, at 4 to 7 ppm.

(Primary Effects of the Present Aspect)

As described above, the aluminum purity, Fe content, and total content of crystallized or precipitated Fe are optimized in the aluminum plate for an aluminum electrolytic capacitor electrode of the present aspect, and therefore deep etching is possible without the etching pits being joined. A thickness of 0.2 to 1 mm is attained, allowing etching to proceed more deeply. An anode having a high electrical capacitance per unit area can therefore be obtained, and therefore the number of layers can be reduced when ensuring the electrical capacitance of a solid aluminum electrolytic capacitor having layered anodes. Increased capacity, reduced size, and improved high-frequency characteristics can therefore be attained for a solid aluminum electrolytic capacitor even when the thickness of the aluminum plates is 0.2 to 1 mm. As a result of combining the aforementioned configurations, the core part can be left thick; therefore, an external terminal can be connected to a lateral face of the core part even when a terminal is not able to be joined to, e.g., the surface of the anode. Therefore, portions that do not provide electrical capacitance to the anode due to the connection with the terminal are not generated. Even when anodes are layered, the height dimension will not increase, and the high-frequency characteristics will not deteriorate provided that the terminal is connected to the lateral face of the core part.

According to the configuration of the present aspect, an anode can be chemically converted at, e.g., 20 V, and an electrical capacitance of, e.g., 200 $\mu F/cm^2$ can be obtained. The effective area can be increased 30% by employing the terminal joining of the present aspect. As a result, when a 10 V-150 $\mu F$ capacitor was manufactured in a D case (7.5×4.3 mm), an electrical capacitance equivalent to a conventional 10-layer product having a height of 4.2 mm was able to be obtained using three layers at a height of 2.8 mm.

The results shown below were obtained for the frequency characteristics (impedance value) when manganese dioxide was used as a solid electrolyte.

TABLE 1

|  | 100 kHz | 1000 kHz | Product Height |
|---|---|---|---|
| Present invention | 0.055 Ω | 0.023 Ω | 2.8 mm |
| Conventional article | 0.097 Ω | 0.046 Ω | 4.2 mm |
| Tantalum capacitor | 0.120 Ω | 0.098 Ω | 2.8 mm |

The results shown below were obtained for the frequency characteristics (impedance value) when polypyrrole was used as a solid electrolyte.

TABLE 2

|  | 100 kHz | 1000 kHz | Product Height |
|---|---|---|---|
| Present invention | 0.023 Ω | 0.003 Ω | 2.8 mm |
| Conventional article | 0.067 Ω | 0.008 Ω | 4.2 mm |

Embodiment 2

The present aspect corresponds to cases in which direct-current etching is employed. The aluminum plate for an aluminum electrolytic capacitor electrode according to the present aspect comprises aluminum of not less than 99.98% by mass and 5 to 50 ppm of Fe, wherein the cube orientation content is 80% or more, and the thickness is 0.2 to 1 mm.

When a solid aluminum electrolytic capacitor is manufactured using such an aluminum plate, direct-current etching is first performed and the surface area of the aluminum plate is enlarged so as to leave a core part having an average thickness of 50 to 150 μm in the central portion in the thickness direction, after which anodic oxidation is performed, and a capacitor anode is formed.

A lead wire or other anode lead is then joined by spot welding to a lateral face of the core part of the capacitor anode.

A solid electrolyte layer is then formed on the surface of the capacitor anode, after which a cathode is formed on the surface of the solid electrolyte layer using a carbon paste, a silver paste, or the like; and an electrode article is formed. A prescribed number of electrode articles are then layered, and a solid aluminum electrolytic capacitor is manufactured. The rest of the configuration is the same as Embodiment 1, and a description will therefore be omitted.

The diameter of the etching pits must be thick when using such direct-current etching to fashion, e.g., a material that is appropriate for a chemical formation voltage of 200 V, and therefore direct electrical current in which the numerous compounds present are not made into starting points for pits is necessary. The starting points for the etching pits are the oxides in the oxidation film on the plate surface. The distribution of oxides can be controlled by the temperature of the annealing for causing the growth of cube-oriented particles. If the ultimate voltage region to be used is high, the final annealing temperature is reduced in the range for causing adequate growth of cube-oriented particles in the plate, and the amount of oxides is reduced. If the number of pit starting points is reduced, the pit density will decrease and the pit diameter will therefore increase. If the usage voltage is relatively low, the final annealing temperature is increased, and the amount of oxides is increased, whereby the pit density increases, and the pit diameter decreases. Final annealing at, e.g., 480 to 530° C. is preferable at a chemical formation voltage of 200 to 400 V, and final annealing at 530 to 600° C. is preferable for higher chemical formation voltages.

A high cube orientation content in the crystal particle structure within the plate is important during direct-current etching when using such an aluminum plate for an aluminum electrolytic capacitor electrode both in middle or high voltage aluminum electrolytic capacitors and in low voltage solid aluminum electrolytic capacitors. Etching pits resulting from direct electrical current have the property of proceeding in a straight line in accordance with the crystal orientation, and therefore the extent to which the etching pits coalesce with other pits and collapse will be reduced to the extent that the proportion of pits progressing perpendicularly to the plate surface increases. The electrical capacitance will therefore increase to the extent that the cube orientation content increases. The proportion should be 80% or more, and preferably 90% or more.

Primarily the amount of Fe, as well as the amounts of Si, Ni, and other impurities must be controlled as in Embodiment 1 in order to increase the cube orientation content. The purity of the aluminum should be 99.98% by mass or more, and preferably 99.99% by mass or more. Various impurities will hinder cube-oriented growth when the purity is less than this amount. Controlling the amount of Fe is particularly vital. An appropriate range for the amount of Fe is 5 to 50 ppm, and preferably 5 to 20 ppm. The growth of cube-oriented particles will be significantly hindered when the amount of Fe exceeds the value for the upper limit. The growth of crystal particles will not be able to be limited when the amount of Fe is less than the lower limit, and coarse particles will be formed in significant amounts during final annealing. These coarse particles will have an orientation other than cube orientation, and, though the mechanism is not certain, the properties of the oxidation film will be different from those of an oxidation film formed on crystal particles having cube orientation. This phenomenon is ultimately a cause of deviations in electrical capacitance and is therefore not preferable.

Etching using direct electrical current is performed so that the average thickness of the core part reaches 50 to 150 μm. The etching should be divided into two or more stages when performing etching using direct current as well as when using alternating current. In the first stage, a higher current density is used than in the second and subsequent stages (referred to as "etching for enlarging pit diameter"), and initial pits are formed. A 60 to 90° C. mixed-acid solution having 2 to 4 mol/L of sulfate ions and 0.5 to 2 mol/L of chlorine ions should be used as the electrolyte. The current density and the amount of electricity should be chosen according to the prescribed plate thickness from within ranges of 0.2 to 1 A/cm² and 30 to 500 C/cm², respectively. In the etching for enlarging pit diameter, the electrolyte solution contains 1 to 2 mol/L of chlorine ions. A solution should be used in which a minute amount of sulfate ions, nitrate ions, phosphate ions, oxalate ions, or other types of oxidizing ions are added alone or in combination in order to prevent dissolution of the surface. An addition amount in the range of 0.01 to 0.5 mol/L is adequate. The solution temperature is preferably 60 to 90° C. The pit diameter will be enlarged by direct electrical current or by immersive chemical dissolution when using such a solution. The current density for electrolysis is preferably approximately 0.1 to 0.6 A/cm². Etching is performed so that the amounts of dissolution from both direct-current electrolysis and chemical dissolution are 1 to 10 times the amounts of the first stage, and preferably 1 to 5 times. The etching time is set so that the average thickness of the core part reaches 50 to 150 μm.

INDUSTRIAL APPLICABILITY

As described above, the aluminum purity, Fe content, and total content of crystallized or precipitated Fe or the cube orientation content are optimized in the present invention, and therefore deep etching is possible without the etching pits being joined. A thickness of 0.2 to 1 mm is attained, allowing etching to proceed more deeply, e.g., to a depth of 50 μm or more or 100 μm or more. An anode having a high electrical capacitance per unit area can therefore be obtained, and therefore the number of layers can be reduced when ensuring a prescribed electrical capacitance for a capacitor having layered anodes. Increased capacity, reduced size, and improved high-frequency characteristics can therefore be attained for an aluminum electrolytic capacitor even when the thickness of the aluminum plates is 0.2 to 1 mm. As a result of combining the aforementioned configurations, the core part can be left thick; therefore, an external terminal can be connected to a lateral face of the core part even when a terminal is not able to be joined to, e.g., the surface of the anode. Therefore, portions that do not provide electrical capacitance to the anode due to the connection with the terminal are not generated. Even when anodes are layered, the height dimension will not increase, and the high-frequency characteristics will not deteriorate provided that the terminal is connected to the lateral face of the core part.

The invention claimed is:

1. An aluminum electrolytic capacitor, wherein a capacitor anode in which a dielectric film and a solid electrolyte layer are formed on at least the etching surface of an aluminum plate, and an anode lead that is electrically connected to the capacitor anode, wherein
   the aluminum plate is composed of aluminum of not less than 99.98% by mass, an Fe content of 5 to 50 ppm, with the balance consisting of unavoidable impurities, and has a total content of crystallized or precipitated Fe of 1 to 50% of the original Fe content;
   the capacitor anode is formed by etching the aluminum plate having a thickness of 0.2 to 1 mm so as to leave a core part having an average thickness of 50 to 150 μm in the central portion in the thickness direction; and
   the etching is performed over the entirety of the front and back surfaces of the capacitor anode.

2. The aluminum electrolytic capacitor of claim 1, wherein the anode lead is joined to a lateral face of the core part.

3. The aluminum electrolytic capacitor of claim 1, wherein a plurality of the capacitor anodes are layered together.

4. An aluminum electrolytic capacitor wherein a capacitor anode in which a dielectric film and a solid electrolyte layer are formed on at least the etching surface of an aluminum plate, and an anode lead that is electrically connected to the capacitor anode, wherein
   the aluminum plate is composed of aluminum of not less than 99.98% by mass, an Fe content of 5 to 50 ppm, with the balance consisting of unavoidable impurities, and has a total content of crystallized or precipitated Fe of 1 to 50% of the original Fe content;
   the capacitor anode is formed by etching the aluminum plate having a thickness of 0.2 to 1 mm so as to leave a core part having an average thickness of 50 to 150 μm in the central portion in the thickness direction; and
   the anode lead is joined to a lateral face of the core part.

5. An aluminum electrolytic capacitor wherein a capacitor anode in which a dielectric film and a solid electrolyte layer are formed on at least the etching surface of an aluminum plate, and an anode lead that is electrically connected to the capacitor anode, wherein
   the aluminum plate is composed of aluminum of not less than 99.98% by mass, an Fe content of 5 to 50 ppm, with the balance consisting of unavoidable impurities, and has a total content of crystallized or precipitated Fe of 1 to 15 ppm;
   the capacitor anode is formed by etching the aluminum plate having a thickness of 0.2 to 1 mm so as to leave a core part having an average thickness of 50 to 150 μm in the central portion in the thickness direction; and
   the etching is performed over the entirety of the front and back surfaces of the capacitor anode.

6. The aluminum electrolytic capacitor of claim 5, wherein the anode lead is joined to a lateral face of the core part 7. The aluminum electrolytic capacitor of claim 5, wherein a plurality of the capacitor anodes are layered together.

8. An aluminum electrolytic capacitor wherein a capacitor anode in which a dielectric film and a solid electrolyte layer are formed on at least the etching surface of an aluminum plate, and an anode lead that is electrically connected to the capacitor anode, wherein
   the aluminum plate is composed of aluminum of not less than 99.98% by mass, an Fe content of 5 to 50 ppm, with the balance consisting of unavoidable impurities, and has a total content of crystallized or precipitated Fe of 1 to 15 ppm;
   the capacitor anode is formed by etching the aluminum plate having a thickness of 0.2 to 1 mm so as to leave a core part having an average thickness of 50 to 150 μm in the central portion in the thickness direction; and
   the anode lead is joined to a lateral face of the core part.

9. An aluminum electrolytic capacitor wherein a capacitor anode in which a dielectric film and a solid electrolyte layer are formed on at least the etching surface of an aluminum plate, and an anode lead that is electrically connected to the capacitor anode, wherein
   the aluminum plate is composed of aluminum of not less than 99.98% by mass, an Fe content of 5 to 50 ppm, with the balance consisting of unavoidable impurities, and has a cube orientation content of 80% or more;
   the capacitor anode is formed by etching the aluminum plate having a thickness of 0.2 to 1 mm so as to leave a core part having an average thickness of 50 to 150 μm in the central portion in the thickness direction; and the etching is performed over the entirety of the front and back surfaces of the capacitor anode.

10. The aluminum electrolytic capacitor of claim 9, characterized in that wherein the anode lead is joined to a lateral face of the core part.

11. The aluminum electrolytic capacitor of claim 9, wherein a plurality of the capacitor anodes are layered together.

12. An aluminum electrolytic capacitor wherein a capacitor anode in which a dielectric film and a solid electrolyte layer are formed on at least the etching surface of an aluminum plate, and an anode lead that is electrically connected to the capacitor anode, wherein the aluminum plate is composed of aluminum of not less than 99.98% by mass, an Fe content of 5 to 50 ppm, with the balance consisting of unavoidable impurities, and has a cube orientation content of 80% or more;

in the formation of the capacitor anode, the aluminum plate, which has a thickness of 0.2 to 1 mm, is etched so as to leave a core part having an average thickness of 50 to 150 μm in the central portion in the thickness direction; and the anode lead is joined to a lateral face of the core part.

13. A method for manufacturing an aluminum electrolytic capacitor in which a capacitor anode is formed by performing anodic oxidation on an aluminum plate, wherein the aluminum plate is composed of aluminum of not less than 99.98% by mass, an Fe content of 5 to 50 ppm, with the balance consisting of unavoidable impurities, and has a total content of crystallized or precipitated Fe of 1 to 50% of the original Fe content;

alternating-current etching is performed and the surface area of the aluminum plate, which has a thickness of 0.2 to 1 mm, is enlarged so that a core part having an average thickness of 50 to 150 μm is left in the central portion in the thickness direction;

anodic oxidation is subsequently performed;

the aluminum plate is cut after the anodic oxidation; and the capacitor anode is formed having the entirety of the front and back surfaces subjected to the alternating-current etching and the anodic oxidation.

14. The method for manufacturing an aluminum electrolytic capacitor of claim 13 comprising joining an anode lead to a lateral face of the core part.

15. The method for manufacturing an aluminum electrolytic capacitor of claim 14, wherein laser welding is used to join the anode lead to the lateral face of the core part.

16. A method for manufacturing an aluminum electrolytic capacitor in which a capacitor anode is formed by performing anodic oxidation on an aluminum plate, wherein the aluminum plate is composed of aluminum of not less than 99.98% by mass, an Fe content of 5 to 50 ppm, with the balance consisting of unavoidable impurities, and has a total content of crystallized or precipitated Fe of ito 15 ppm; and alternating-current etching is performed and the surface area of the aluminum plate, which has a thickness of 0.2 to 1 mm, is enlarged so that a core part having an average thickness of 50 to 150 μm is left in the central portion in the thickness direction;

anodic oxidation is subsequently performed;

the aluminum plate is cut after the anodic oxidation; and the capacitor anode is formed having the entirety of the front and back surfaces subjected to the alternating-current etching and the anodic oxidation.

17. A method for manufacturing an aluminum electrolytic capacitor in which a capacitor anode is formed by performing anodic oxidation on an aluminum plate, wherein the aluminum plate is composed of aluminum of not less than 99.98% by mass, an Fe content of 5 to 50 ppm, with the balance consisting of unavoidable impurities, and has a cube orientation content of 80% or more; and direct-current etching is performed and the surface area of the aluminum plate, which has a thickness of 0.2 to 1 mm, is enlarged so that a core part having an average thickness of 50 to 150 μm is left in the central portion in the thickness direction;

anodic oxidation is subsequently performed;

the aluminum plate is cut after the anodic oxidation; and the capacitor anode is formed having the entirety of the front and back surfaces subjected to the direct-current etching and the anodic oxidation.

18. A method for manufacturing an aluminum electrolytic capacitor in which a capacitor anode is formed by performing anodic oxidation on an aluminum plate, wherein the aluminum plate is composed of aluminum of not less than 99.98% by mass, an Fe content of 5 to 50 ppm, with the balance consisting of unavoidable impurities, and has a cube orientation content of 80% or more; and direct-current etching is performed and the surface area of the aluminum plate, which has a thickness of 0.2 to 1 mm, is enlarged so that a core part having an average thickness of 50 to 150 μm is left in the central portion in the thickness direction;

anodic oxidation is subsequently performed; and the capacitor anode is formed.

* * * * *